United States Patent [19]

Courtemanche

[11] Patent Number: 5,730,510
[45] Date of Patent: Mar. 24, 1998

[54] SNOWMOBILE DRIVE TRACK WITH NOISE REDUCING TREAD PATTERN

[75] Inventor: Denis Courtemanche, Richmond, Canada

[73] Assignee: Camoplast Inc., Sherbrooke, Canada

[21] Appl. No.: 711,256

[22] Filed: Sep. 9, 1996

[51] Int. Cl.⁶ .................................................. B62D 55/26
[52] U.S. Cl. ............................................ 305/168; 305/178
[58] Field of Search ........................ 305/35 R, 35 EB, 305/165, 166, 167, 168, 169, 170, 171, 178, 179, 180

[56] References Cited

U.S. PATENT DOCUMENTS

| | | | |
|---|---|---|---|
| 2,476,828 | 7/1949 | Skromme | 305/178 X |
| 3,598,454 | 8/1971 | Richards | 305/169 X |
| 3,704,918 | 12/1972 | Perreault | 305/179 X |
| 3,762,779 | 10/1973 | Russ, Sr. | 305/178 |
| 3,830,551 | 8/1974 | Masaoka et al. | 305/179 |
| 3,858,948 | 1/1975 | Johnson et al. | 305/178 |
| 4,938,546 | 7/1990 | Simmons | 305/180 |
| 4,991,911 | 2/1991 | Blais | 305/168 |

OTHER PUBLICATIONS

Roetin "Traction Control Systems" 1989 Catalog (page 6 only).
Saber "Snowmobile Traction Products" 1995 Catalog.

*Primary Examiner*—Russell D. Stormer
*Attorney, Agent, or Firm*—Wilson Sonsini Goodrich & Rosati

[57] ABSTRACT

A snowmobile drive track includes an endless body having a ground engaging outer side on which is displayed, on every three successive crossbar receiving areas, a tread pattern which is repeated over the entire outer side. This profile configuration allows for a reduction of rubber material on the track and, therefore, a reduction of noise produced by the track as it rotates.

18 Claims, 3 Drawing Sheets

SNOWMOBILE DRIVE TRACK WITH NOISE REDUCING TREAD PATTERN

FIELD OF THE INVENTION

The present invention pertains to a snowmobile drive track and, more particularly, to a track for snowmobiles having an improved tread configuration on its outer side.

BACKGROUND OF THE INVENTION

Snowmobile tracks are formed of an assembly of a molded rubber base having, embedded therein, one or more layers or reinforcing fabric and a series of bars that extend crosswise of the track in central and lateral portions thereof. These crossbar portions display a series of raised profiles, each defining a ground engaging projection which provides traction and control to the track. These projections are a source of noise at certain rotational speeds of the endless track. Indeed, at speeds of between 40 and 70 mph, noise produced by the track is heard; above 70 mph, the motor noise usually overtakes the track noise.

OBJECT AND STATEMENT OF THE INVENTION

It has been found that this track noise can be greatly reduced if the noise frequency generated by the track profiles is decreased thus providing comfort to the driver and to the environment.

It is therefore an object of the present invention to provide the outer side of a snowmobile drive track with a tread configuration that includes profile-free regions to reduce this frequency and effect noise reduction.

The present invention therefore relates to a snowmobile drive track which consists of an endless body having a ground engaging outer side and a suspension supporting inner side; the body defines a central portion and opposite lateral portions interconnected by a plurality of longitudinally spaced suspension bearing portions; the body also displays a plurality of longitudinally spaced crossbar receiving areas extending crosswise of the body in its central, lateral and suspension bearing portions, each crossbar receiving area displaying, on the outer side of the body, integrally formed projecting profiles; the profiles of three successive crossbar receiving areas define a tread pattern which is identically repeated on all successive threesome of crossbar receiving areas. The profiles of at least one of the three successive crossbar receiving areas differ in configuration from the profiles of the other while each crossbar receiving area includes a profile-free region thereon.

Most snowmobile tracks are presently configured with a 48 or a 54-pitch design; hence, the tread pattern of the present invention is adaptable to such tracks.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
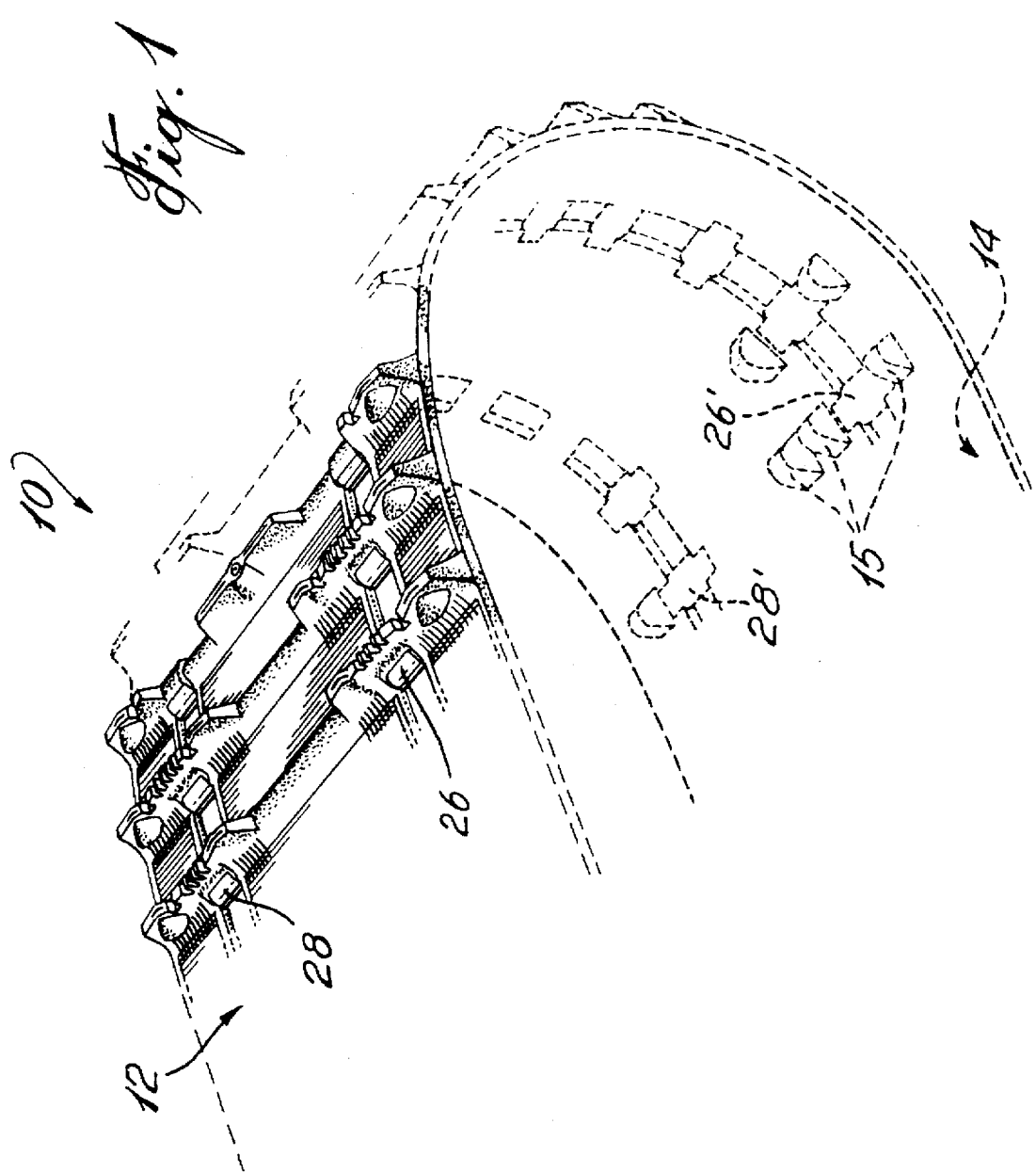
FIG. 1 is a perspective view of a portion of a snowmobile track bearing a tread design made in accordance with the present invention.

Referring to FIG. 1, there is shown, in part, an endless snowmobile track, generally denoted 10, for propelling a snowmobile over snow, ice, or other similar ground structure. The mounting of this track to a snowmobile is well known and needs not be detailed. The track has a ground engaging outer side 12 and an inner side 14 that receives and supports, on the lower run thereof, a suspension which may consist of a wheel assembly or a slide rail assembly, both of which are also well known in the art.

Conventionally, the track rotates by means of a motor driven sprocket unit at the forward end of the vehicle and idle drive wheels are mounted at the aft end of the vehicle to support the rear end of the track. Sprockets engage a series of lugs 15 integrally formed with the inner surface of the track.

Figure 2:
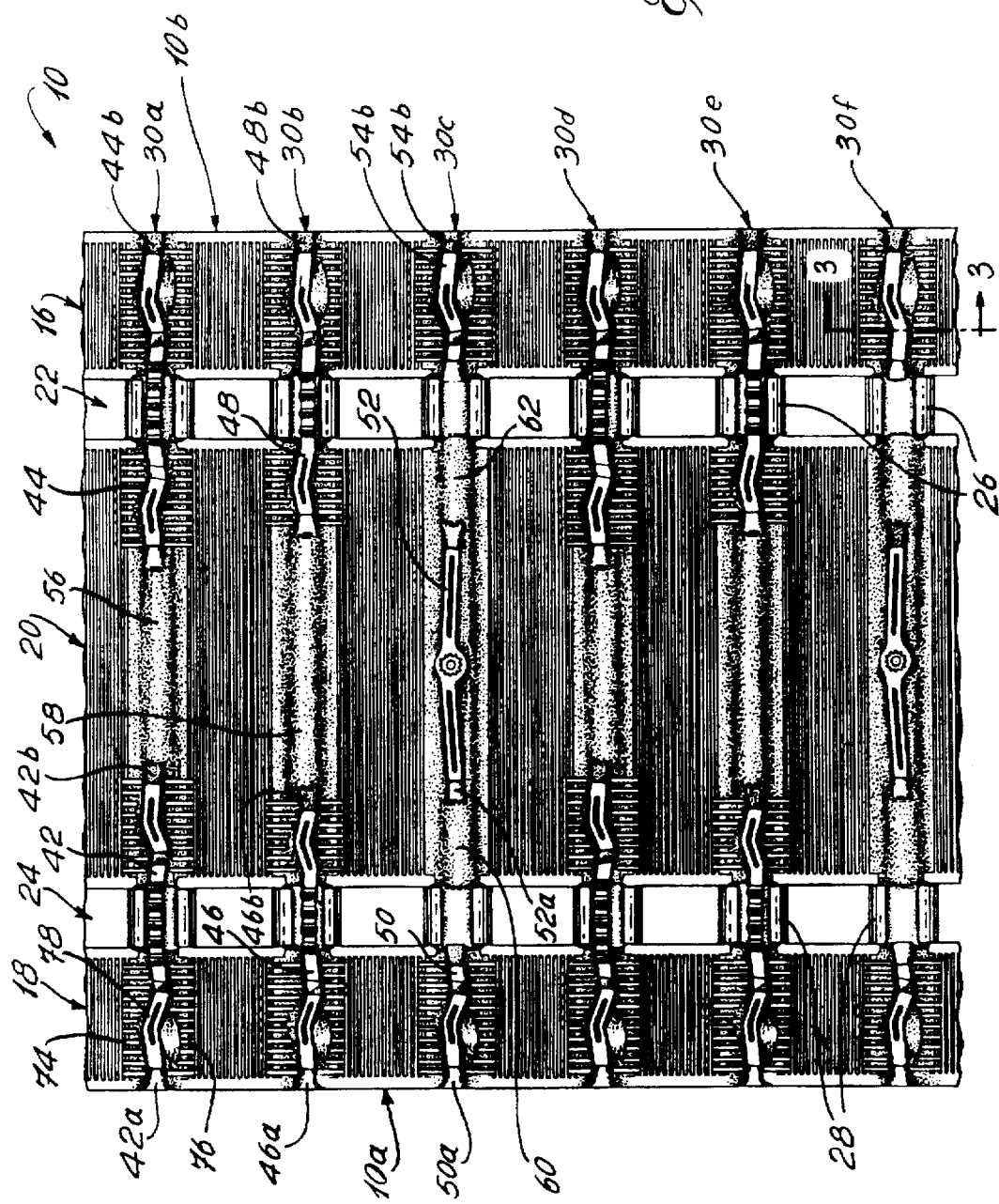
FIG. 2 is a top plan view showing part of the ground engaging outer side of the track.

As illustrated in FIG. 2, the track defines a pair of opposite lateral portions 16 and 18 and a central portion 20. These portions are interconnected by a plurality of longitudinally spaced suspension bearing portions 22 and 24 which are each partially covered by metallic clips 26, 28. These clips may have various forms; however, they are structured so that, in the case of a slide rail suspension system, the rails that support the chassis of the snowmobile slide on the rear faces 26', 28' of the clips. Such clips may be found described in U.S. Pat. No. 4,474,414 issued Oct. 2, 1984 to Tokue.

Figure 3:
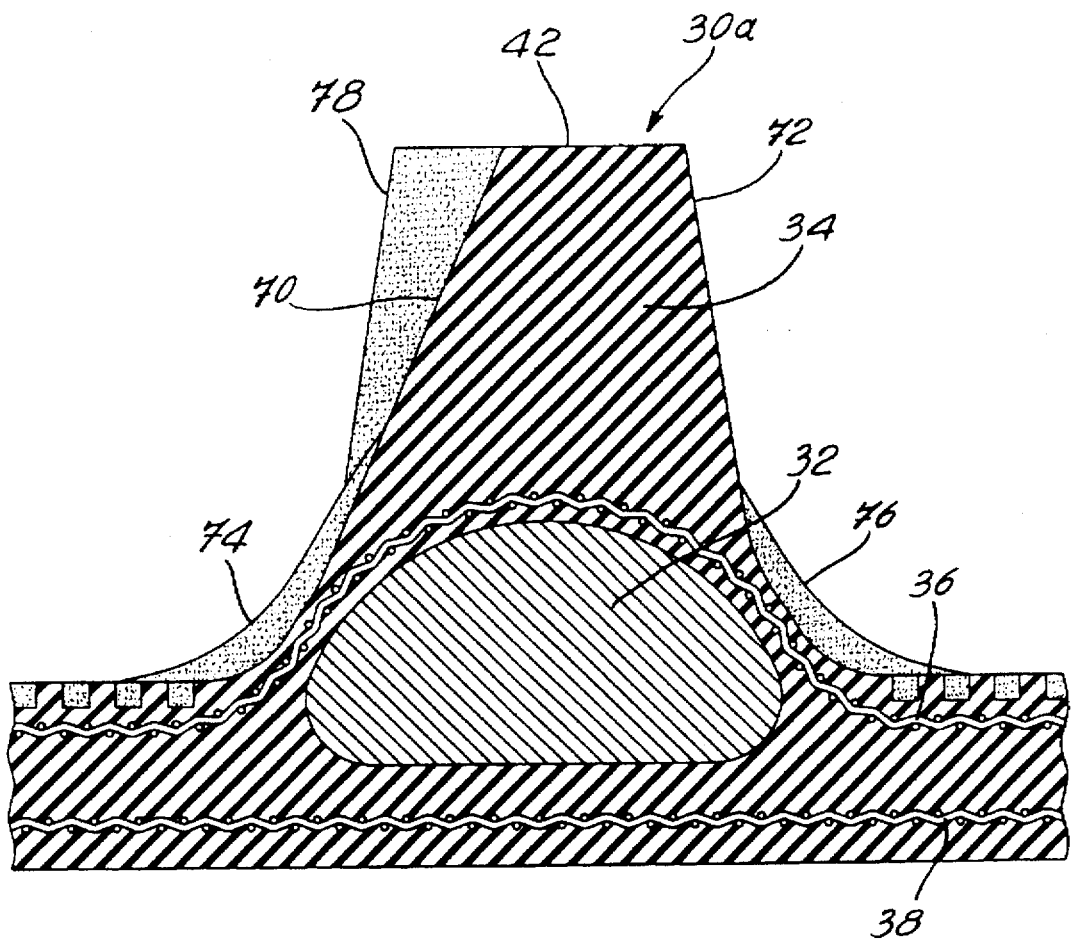
FIG. 3 is a cross sectional view taken along lines 3—3 of FIG. 2.

The snowmobile track 10 also defines a plurality of crossbar receiving areas 30 that extend through the central, lateral and suspension bearing portions of the track. Referring to FIG. 3, these areas incorporate a crossbar 32 which preferably consists of a rod, made of composite material, having a shape as illustrated with rounded corners. In the track illustrated in FIG. 2, six crossbar receiving areas have been identified as 30a, 30b, 30c, 30d, 30e and 30f.

As can be seen in FIG. 3, the track is formed of an assembly of a molded rubber base 34 and two layers of reinforcing fabric 36 and 38. Some tracks may also include a plurality of longitudinally extending cords. The reinforcing fabric is a woven fabric of synthetic fibers while cords, when present, may be plastic or metal.

Referring to FIG. 2, the crossbar receiving areas 30a–30f each display an arrangement of a trapezoidal-shaped profile region and a profile-free region. For example, the crossbar receiving area 30a displays two profiles 42 and 44; the crossbar receiving area 30b also displays two crossbars 46 and 48 while the crossbar receiving area 30c displays three profiles 50, 52 and 54. A profile-free region 56 is present between the profiles 42 and 44 while a second profile-free region 58 is provided between the two profiles 46 and 48. On the other hand, there are two profile-free regions 60 and 62 between the profiles 50 and 52 and the profiles 52 and 54.

This arrangement of profiles and profile-free regions defines a tread pattern which is repeated identically on the three successive crossbar receiving areas 30d, 30e and 30f as well as on the remaining crossbar receiving areas.

In the embodiment illustrated, profiles 42 and 44 have the same width but their width is different from that of profiles 46 and 48 so that the profile-free region 56 is less wide than the profile-free region 58 of the crossbar receiving area 30b. The profiles 50 and 54 of the crossbar receiving area 30c extend only in the lateral portions 16 and 18 of the track while the profile 52 extends in the central region of the track where are also provided the two profile-free regions 60 and 62.

With this particular tread configuration, there is no profile-free region which is present at the same location when viewed in the longitudinal direction of the track. In both opposite lateral portions of the track 16 and 18, there is a profile for each crossbar receiving area while, in the central portion 20 of the track, the profile-free regions are located at different places so that the side edge 52a of trapezoidal profile 52 is closer to the sprocket receiving portion 24 than the side edges 46b and 42b of profiles 46 and 42. On the other hand, the side edges 42a, 46a and 50a are adjacent the side edge 10a of the track while the side edges 44b, 48b and 54b are adjacent the side edge 10b of the track. Referring to FIG. 3, each profile includes a leading wall and a trailing wall; for example, profile 42 has a leading wall 70 and a trailing wall 72. These walls include a series of vertical reinforcing ribs 74 and 76 respectively, the function of which is described and claimed in a copending application of applicant filed concurrently herewith. Preferably, the profiles include a V-shaped outline 78 with the apex being on the leading wall of the profile. Similarly, the top edge of the profiles in the area of the slide bearing portions 22 and 24 are preferably corrugated.

Although the invention has been described above with respect with one specific form, it will be evident to a person skilled in the art that it may be modified and refined in various ways. For example, it is possible to have a tread pattern where two of the three successive crossbar receiving areas have the same profile configuration, but which is different from that of the third crossbar receiving area. It is therefore wished to have it understood that the present invention should not be limited in scope, except by the terms of the following claims.

The embodiments of the invention in which an exclusive property or privilege is claimed are defined as follows:

1. A snowmobile drive track comprising an endless body having a ground engaging outer side and a suspension supporting inner side; said body defining a central portion and opposite lateral portions interconnected by a plurality of longitudinally spaced suspension bearing portions; said body displaying a plurality of longitudinally spaced crossbar receiving areas extending crosswise of said body in said central, lateral and suspension bearing portions; each said crossbar receiving area displaying, on said outer side of said body, integrally formed projecting profiles; the profiles of three successive crossbar receiving areas defining a tread pattern which is identically repeated on all successive threesome of crossbar receiving areas; the profiles of at least one of said three successive crossbar receiving areas differing in configuration from the profiles of the others; each said crossbar receiving area including a profile free region thereon but said track being free of profile free regions when viewed in a longitudinal direction to provide noise reduction when said track is driven.

2. A snowmobile track as defined in claim 1, wherein the profiles of each of said three successive crossbar receiving areas differ in configuration from one another.

3. A snowmobile drive track as defined in claim 2, wherein said profiles define a trapezoidal shape having a top edge and opposite side edges; each said opposite lateral portions of said body including a profile with an outer side edge thereof adjacent a side edge of said body.

4. A snowmobile drive track as defined in claim 3, wherein a first of said three successive crossbar receiving areas displays three laterally spaced profiles, two of which being located in said opposite lateral portions of said body and a third in said central portion of said body.

5. A snowmobile drive track as defined in claim 4, wherein a second and a third of said three successive crossbar receiving areas each display a pair of profiles separated by a profile-free region in said central portion of said body.

6. A snowmobile drive track as defined in claim 5, wherein the profile-free regions in said second and third crossbar receiving areas have differing width.

7. A snowmobile drive track as defined in claim 6, wherein the width of the third profile of said first of said three successive crossbar receiving areas is greater than the smallest of the widths of the profile-free regions of said second and third of said three successive crossbar receiving areas.

8. A snowmobile drive track as defined in claim 5, wherein said top edges of said pair of profiles display corrugations in the sprocket engaging portions of said body.

9. A snowmobile drive track as defined in claim 3, wherein the profiles have a V-shaped outline.

10. Apparatus, comprising: a drive track including an endless body having an outer side and an inner side,
    said endless body defining a central portion, a first lateral portion connected to said central portion with a first bearing portion, and a second lateral portion connected to said central portion with a second bearing portion,
    said endless body including a plurality of crossbar receiving areas extending 1) in a cross-wise direction relative to said endless body and 2) across said first lateral portion, said first bearing portion, said central portion, said second bearing portion, and said second lateral portion,
    each of said crossbar receiving areas including, on said outer side, 1) a series of integrally formed profiles extending in said cross-wise direction and 2) a profile free region, the profiles of three successive crossbar receiving areas defining a tread pattern which is identically repeated on all successive threesome of crossbar receiving areas, the profiles of at least one of said three successive crossbar receiving areas differing in configuration from the profiles of the others, said drive track being free of profile free regions when viewed in a longitudinal direction to provide noise reduction when said drive track is driven.

11. The apparatus of claim 10, wherein the profiles of each of said three successive crossbar receiving areas differ in configuration from one another.

12. The apparatus of claim 11, wherein said profiles define a trapezoidal shape having a top edge and opposite side edges; each said opposite lateral portions of said body including a profile with an outer side edge thereof adjacent a side edge of said body.

13. The apparatus of claim 12, wherein a first of said three successive crossbar receiving areas displays three laterally spaced profiles, two of which being located in said opposite lateral portions of said body and a third in said central portion of said body.

14. The apparatus of claim 13, wherein a second and a third of said three successive crossbar receiving areas each display a pair of profiles separated by a profile-free region in said central portion of said body.

15. The apparatus of claim 14, wherein the profile-free regions in said second and third crossbar receiving areas have differing width.

16. The apparatus of claim 15, wherein the width of the third profile of said first of said three successive crossbar receiving areas is greater than the smallest of the widths of the profile-free regions of said second and third of said three successive crossbar receiving areas.

17. The apparatus of claim 14, wherein said top edges of said pair of profiles display corrugations in the sprocket engaging portions of said body.

18. The apparatus of claim 12, wherein the profiles have a V-shaped outline.

* * * * *